United States Patent Office 3,551,165
Patented Dec. 29, 1970

3,551,165
PROCESS FOR PRODUCING SHAPED DOUGH PIECES AND APPARATUS
Stanley Hamilton Reesman, 1488 W. Michigan, and James Harold Cole, 50 Woodward, both of Battle Creek, Mich. 49017
Filed Nov. 8, 1967, Ser. No. 681,353
Int. Cl. A23l 1/18
U.S. Cl. 99—81             3 Claims

ABSTRACT OF THE DISCLOSURE

A shaped dough piece is produced by extruding an amylaceous dough mass through restrictive orifices in an extrusion barrel having a plurality of flow control pins spaced from one another such that the dough flows therethrough at different velocities, thus producing reliefs or embossing patterns in the extruded product. The extrudate is then dried and puffed.

---

This invention relates to process and apparatus for producing a puffed amylaceous piece having a distinctive shape.

In general prior art processes for providing shape to amylaceous dough masses such as cereal dough flours which have been cooked or uncooked have relied upon the outline of an extruding orifice for shape definition, the transverse surfaces of the cut extrudate in each instance being substantially planar and perpendicular to the axis of extrusion. As a consequence, the shape provided such a dough piece is dictated primarily by the outline of the extruding die itself, limiting the range of selectable shapes and patterns.

A process and device has now been developed whereby the surfaces substantially perpendicular to the axis of flow of the amylaceous dough are in relief and in general have an appearance predetermined by conditions created in an extrusion die to be hereinafter described. Such a development expands the range of puffed shapes which can be practiced. The extrudate can be cut continually as in the prior art and thereafter subjected to the influences of puffing as by atmospheric gun- or vacuum gun-puffing, oven puffing in a high air velocity oven having a high circulating air temperature or any other means which will effectively induce the rapid flashing of water vapor from the dough; the preferred puffing technique is the latter-mentioned high velocity, high temperature air puffing operation wherein the "embossed" dough mass may be fluidized and incident to which it is puffed. However, the invention is not to be restricted to any particular such means of puffing. Generally, puffing accentuates the relief or "embossment" which is induced in transverse dough faces the present invention such that any surface appearance that has been predetermined will become more exaggerated but yet will be distinct after puffing.

Briefly stated, the invention comprises subjection of an amylaceous dough mass of cereal of tuberous origin and in a substantially gelatinized condition to an extrusion operation wherein the dough mass is caused to pass over a predetermined pattern of flow control pins located in the extrusion orifice and whereby differentials in extrudate velocity across a given die cross-section are produced. As a consequence, the dough issues at the free end of the extrusion orifice at varying predetermined rates, the rate differences being selected to achieve the desired relief or embossing pattern in the extrudate, whereafter the extrudate may be cut by transverse high velocity knife means consecutively dissecting the path of travel of the extrudate. The extrudate may then be semi-dried to a puffable condition of reduced moisture and puffed by flash evaporation of moisture from the semi-dried piece.

Figure 1:
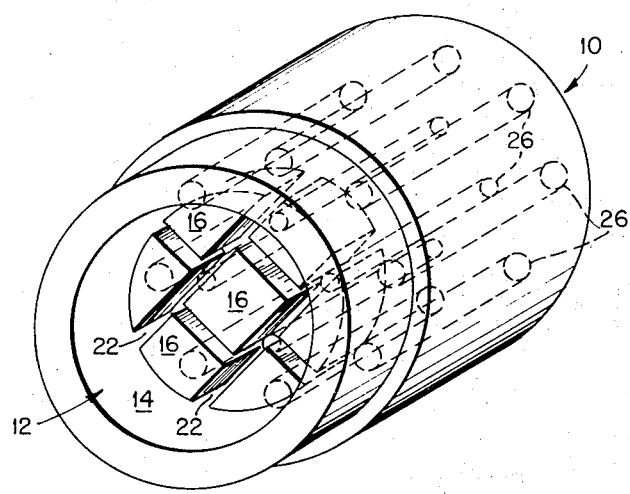
Figure 2:
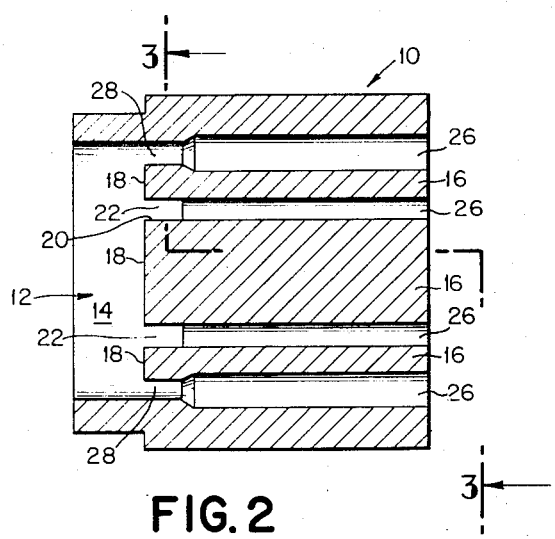
Figure 3:
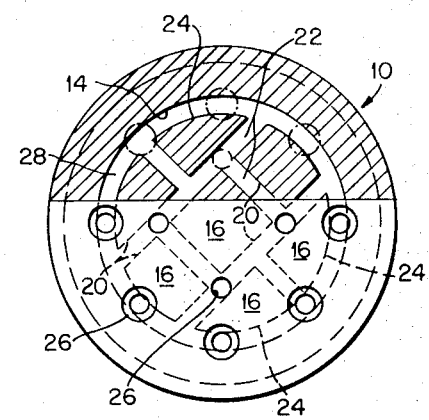
Figure 4:
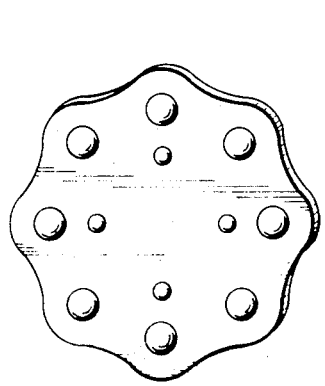
Figure 5:
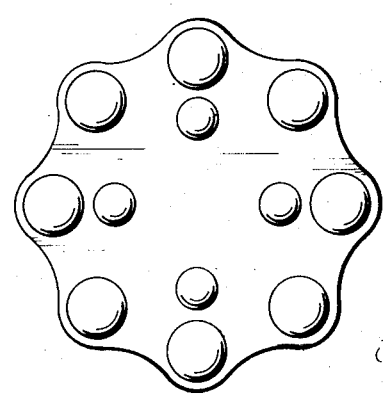

The means whereby such flow control of the extrudate is achieved will be best understood by reference to the accompanying drawings wherein FIG. 1 is an isometric view of one embodiment of die means for practicing the invention; FIG. 2 is a side sectional of the device shown in FIG. 1; FIG. 3 shows an end view partially in section and partially in elevation taken along lines 3—3 in FIG. 2; FIG. 4 is a perspective view of a cut dough extrudate produced by the die means of FIGS. 1 to 3; and FIG. 5 is the embossed shape produced by puffing the dough piece of FIG. 4.

As will be seen by reference to the drawings, each die is generally comprised of a barrel defining a confining chamber 10 which may be cylindrical at the inner surface thereof and is of sufficient strength and thickness to confine pressurized extruded dough passing the extrusion elements nested therein; a die at the forward end of the cylinder and generally shown as 12 has a shape-defining inner face generally shown as 14 intended to give longitudinal shape to the extrudate as it issues. Face 14 may be cylindrical or of any prismatic shape desired such as a star, square, diamond, etc.

Within the shaping die is a nest or network of flow control pins generally shown as 16 and spaced from one another so as to permit plastic flow therearound of an extrudable cereal dough mass, the spacing of respective pins being predetermined in accordance with the desired velocity of movement of the extruding dough. Free ends 18 of the nest of these flow control elements terminate at points upstream from the forward end 12 of the extruding die so that space is provided whereby masses of differentially extruding doughs merge with one another so as to present a unitary continuous transverse surface just prior to emergence from extruding die 12 while being shaped by face 14. The distance between the free ends 18 of the nest of flow control pins 16 and the inner face 14 of the die 12 will be adjusted largely in accordance with intended variations in extrusion velocities induced by the network or nest of flow control pins or elements.

As will be seen from FIGS. 1–3, longitudinal flow control faces 20 are located proximate one another so as to define respective restricted flow channels 22 between adjoining free ends 18 of flow control elements 16; the lateralmost faces 24 of outer flow control elements free ends 18 are located circumjacent but in spaced relation to the cylindrical innerface 14 of die 12 so as to define a similar flow channel 28 circumjacent the areas of restricted flow 22 and inducing different flow velocities and pressures to the dough mass passing therethrough. Dough passing from channels 28 eventually merge with masses in flow passages 22, the merging masses being under extrusion pressure induced at the aft end of the die in dough delivery channels 26 communicating with channels 28 and passages 22.

Hence, a dough portion passing between respective channels 22 and 28 defined by the longitudinal faces of free ends of flow control members 16 and the cylindrical faces 14 of die 12 merge to produce a dough mass of varying dough flow velocities. As a consequence, the dough mass that emerges from the fore end of the die is similarly moving at different velocities. By reason of the dissimilar extrusion velocities that are still present in the dough extrudate exiting from die 12, different regions of the dough extrudate will issue to different extents, resulting in a pattern which will have been predetermined by the differential in extrusion pressures and velocities induced intermediate the faces of dough flow control elements 16 in channels 22 and 28.

To some degree, differences between respective dough flow velocities in adjoining flow control channels will be lessened by the residence time of merging adjacent dough masses in the spaces between annular face 14 of die 12 and free ends 18 of flow control elements 16; the longer the distance between the free ends of said flow control elements and the sleeve 12, the greater will be the opportunity for equalization of both flow velocities. But some residence in this zone will be desired to assure that the various moving dough portions merge with one another. The degree to which a pattern in an extruded dough mass will have a contrasting relief will be influenced therefore by the distance between the foremost extremities of die 12 and flow control elements 16. Similarly, the relation of longitudinal terminals of flow control elements 16 per se, one to another, will influence the relationship between dough flow characteristics in channels 22 defined between adjacent faces 20 of said flow control elements.

Pattern changes created by adjustments in shaping and spacing of flow control elements will be understood to be variable within the spirit of the present invention and will give rise to differences in relief characteristics on the transverse faces of subdivided dough masses.

For the die shown in FIGS. 1–3, a typical dough processing operation will now be described. A dough is formulated from the following ingredients in the weight proportions listed.

Soft wheat flour—7 lbs., 6 oz.
Whole wheat flour—2 lbs., 8 oz.
Malt syrup—11 oz.
Sugar—5 oz.
Salt—4 oz.
Water—2 lbs., 8 oz.

The ingredients are mixed well and cooked at 20 p.s.i.g. for 35 minutes. The cooked material is cooled and then is charged to a conventional auger-feeding extruding apparatus having the die member shown in FIGS. 1–3, the dough being extruded to the aft face of the die member and into the delivery channels 26 with sufficient extrusion pressure to provide the differential extrusion conditions described hereinabove with respect to the flow control elements shown in FIGS. 1–3. Preferably the extrusion pressure is just sufficient to deliver the dough mass past the die face 14 and cause it to issue from the die without inducing any significant expansion of the dough mass as it issues from the forward die 12, although some limited degree of expansion will inevitably result as a consequence of release of the dough from the confinements of the extruding die.

Dough masses passing through barrel 10 and entering flow control chambers 22 and 28 will, as indicated hereinabove, have induced therein differences in extrusion velocity. Dough masses issuing between faces 20 in channel 22 will flow laterally as well as longitudinally around the free ends 18 of flow control elements 16.

After the cooked dough has been thus extruded and transversely cut, the pellets or discs so produced will be seen to have the dimensions and relief pattern shown generally in FIG. 4. The pellets may be dried to a moisture content of 4–15% (preferably 5–10%) by placement on trays to allow them to "dry" at ambient conditions. In general the dough should be dried under conditions which avoid surface case hardening and rather should be dried under conditions wherein the moisture reduction is substantially uniform from the exterior to the interior of the dough. After drying and prior to puffing it will be desirable in some instances to temper the dough and thereby assure uniform moisture distribution.

Thereafter the dough will be puffed preferably in a high-temperature, high-velocity fluidized bed dryer wherein residual moisture will be flashed rapidly from the dough by a heating gas. The dough will be thereby caused to puff to a bulk volume three to five times the original volume of the semi-dried unpuffed dough mass of FIG. 4 and the moisture content of the dough will be reduced by say 50% or more from that level which it had preparatory to puffing.

As will be seen from FIGS. 4 and 5, the dough mass issuing from the die elements shown in FIGS. 1–3 creates a pattern having a plurality of nodular rounded portions surrounded by valleys providing an overall relief effect. Variations in die design will permit different reliefs, all of which variations will be apparent to those skilled-in-the-art from the foregoing illustrative examples of the invention.

What is claimed is:

1. Process for producing shaped dough pieces comprising extruding an amylaceous dough mass to and through a zone having restrictive flow channels therein being provided by a network of flow control elements spaced from one another so as to permit plastic flow therearound of said dough mass and induce variations in a dough flow velocity, thereby causing adjacent moving dough portions of different flow velocities to merge and issue as a unified extrudate, individual portions of which are moving at different velocities, consecutively subdividing the extrudate by transversely moving cutting means whereby adjacent dough portions moving at differing velocities cause at least the leading transverse face of the extrudate to be in relief, semi-drying by subdivided extrudate to a puffable condition and thence puffing the extrudate by flashing water vapor therefrom.

2. The process of claim 1 wherein said network of flow control elements which would induce variations in dough portion velocities are of different shapes and spacing.

3. Apparatus for producing distinctively shaped cuttable doughy and puffable extrudates comprising an extrusion barrel having a shape-defining die opening at the end thereof constituting an extrusion orifice, a network of longitudinal flow control elements mounted in said barrel, the free ends of the flow-control elements adjacent the forward end of said apparatus terminating within the confines of said die-opening and the longitudinally adjacent faces of the flow-control elements being spaced from one another and from the circumjacent inner face of the extruding die, respective spacing between said flow control elements and the extruding die faces being varied to induce different dough flow velocities in the channels therebetween and being so inter-related to cause the transverse face of merged dough portions issuing from said orifice to be in relief.

References Cited
UNITED STATES PATENTS

| | | | |
|---|---|---|---|
| 1,556,617 | 10/1925 | Laskey | 107—14X |
| 1,874,503 | 8/1932 | Greenwood | 107—14 |
| 2,858,218 | 10/1958 | Benson | 99—81 |
| 2,858,219 | 10/1958 | Benson | 99—81X |
| 2,974,613 | 3/1961 | Maldari | 107—14 |
| 3,454,403 | 7/1969 | Maxwell | 99—81 |

RAYMOND N. JONES, Primary Examiner

U.S. Cl. X.R.

109—14